3,725,177
PROCESS FOR BONDING ARTIFICIAL OR SYNTHETIC TEXTILE FIBERS TO RUBBER

Bernardino Vecellio and Fausto Casa, Milan, Italy, assignors to Industrie Pirelli, S.p.A., Milan, Italy
No Drawing. Filed Aug. 31, 1971, Ser. No. 176,722
Claims priority, application Italy, Sept. 2, 1970, 29,262/70
Int. Cl. B32b *31/00;* C09j *3/12*
U.S. Cl. 156—333                                   10 Claims

ABSTRACT OF THE DISCLOSURE

A process for improved bonding between artificial or synthetic textile fibers to rubber is disclosed wherein a polymer having double bonds and chlorine in its structure is grafted onto said fibers which are then placed into direct contact with the rubber followed by curing the rubber. No activation treatment is necessary.

---

The present invention is directed to an improved process for bonding textile fibers to rubber; more precisely, it relates to a process for bonding artificial or synthetic polymeric fibers to rubber.

For many rubber articles it is necessary to join or even to embed a reinforcing material in the rubber in order to allow said articles to withsand various mechanical stresses which occur during use.

Large use is made of textile fibers as a reinforcing material for rubber.

In order to ensure the efficient behavior of such textile fibers as reinforcing materials for rubber, it is necessary to ensure a firm bonding between these two materials by appropriate bonding methods.

In general, conventional bonding methods are based on a preliminary treatment of the textile fibers by liquid adhesive subsances. Usually, the textile fibers to be bonded to rubber are passed into one or more adhesive baths and, after having been subjected to drying, stretching and controlled shrinkage treatments at high temperatures, are placed into contact with the rubber, to which they permanently adhere by virtue of the subsequent curing of the rubber itself.

The use of liquid adhesive substances does not generally involve particular problems when the textile fibers are in the form of continuous filaments, threads or cords.

However, continuous textile fibers are not always employed as reinforcing materials for rubber. Short discontinuous textile fibers, usually having a very reduced length, are also used as reinforcing materials.

Such short discontinuous fibers, also known as "flock," can be embedded in the rubber; however, before carrying out this operation, they are subjected to an adhesive treatment so that a firm bond may be ensured between such fibers and the rubber itself during the curing of the rubber.

It has, however, been noticed that subjecting short discontinuous fibers to a preliminary treatment by means of an adhesive by conventional techniques reduces said fibers to a mass which, even if dried, is very coherent and consequently involves some difficulty when it is incorporated into the rubber; a greater difficulty is encountered if such fibers are to be uniformly dispersed in the rubber itself. The adhesive substance treatment could be carried out on the continuous fibers. These could then be cut to have an already treated flock, but it is unlikely that a manufacturer of textile fibers would carry out such treatment before cutting the fibers.

Bonding processes are presently known wherein one can effect preliminary treatment of continuous textile fibers to be bonded to rubber. Methods other than subjecting said fibers to adhesive substance baths are foreseen. In this respect reference is made, for example, to a process for bonding continuous polymeric synthetic textile reinforcing fibers to rubber, which is based on the graft polymerization of a monomer onto the polymeric fiber to be bonded to rubber. However, in this known process, the resulting grafted polymers require further chemical treatment to obtain active group formation in order to provide satisfactory rubber bonding.

Only after this activating treatment, which is carried out on the polymer already grafted onto the continuous polymeric textile reinforcing fibers, can the rubber be applied on said fibers. The rubber can then be subjected to a curing treatment, during which bonding takes place between the two materials.

Anyhow, discontinuous short artificial or synthetic polymeric textile fibers have not been prepared by grafting polymers on them in order to bond them to a rubber into which they are to be embedded.

An object of the present invention is to provide a bonding process between rubber and artificial or synthetic polymeric reinforcing textile fibers, wherein preliminary grafting of a polymer is carried out on such fibers and wherein the obtained grafted polymer on said textile fibers is placed into contact with the rubber to be bonded to it without having to activate the grafted polymer before the application of the rubber onto it.

A further object of the present invention is to provide a bonding process between discontinuous short artificial or synthetic polymeric reinforcing textile fibers and rubber, which permits one to carry out the incorporation of such fibers in the rubber without difficulty. The former is uniformly distributed in the latter.

According to the invention, the process comprises the steps of: grafting on the textile fibers, by graft polymerization, a polymer containing both double bonds between carbon atoms and chlorine atoms in its structure; placing the textile fibers carrying the grafted polymer into direct contact with the rubber; and carrying out the curing treatment during which bonding takes place.

In particular, the process is characterized by the fact that discontinuous short textile fibers are used, said polymer is grafted on said short fibers, and said short fibers carrying the grafted polymer are directly incorporated into the rubber and are uniformly distributed in the latter. The rubber is cured while being simultaneously subjected to a shaping pressure.

Because the discontinuous short textile fibers carrying a grafted polymer are intended to be directly incorporated in the rubber, according to the present invention it is also provided to effect the grafting directly on continuous fibers and then to cut the fibers into pieces of reduced length in order to obtain short fibers carrying the grafted polymer.

For the purposes of the present invention, the expression "directly" used in the specification and in the claims with reference to the process means that any treatment which may originate a chemical modification of the polymer grafted on the fibers themselves is excluded between the steps of grafting the polymer and of placing the fibers into contact with the rubber.

It is understood that the polymer to be grafted on the textile fibers can be either a homopolymer or a copolymer.

Therefore, for the grafting polymerization on the textile fibers 2,3-dichlorobutadiene-1,3 can be used, which permits the grafting of a homopolymer as defined above or of two monomers to be copolymerized, such as butadiene and alpha-chloroacrylonitrile, which leads to the grafting of the corresponding copolymer.

Conventional techniques well known in this field are used for the graft polymerization of the invention.

Particularly satisfactory bonding results are obtained by using a polyamide or a polyester fiber as the synthetic polymeric textile fiber. Analogous results are obtained by using a fiber of regenerated cellulose (rayon) as an artificial textile fiber.

The polymers grafted on the textile fibers and contained in the above indicated generic definition permit the fibers carrying the grafted polymer to be placed into contact with the rubber immediately after completion of the grafting polymerization treatment, since it is not necessary to operate a chemical treatment to activate the polymer grafted on said fibers in view of their bonding to rubber.

The polymer which remains grafted on the textile fibers according to the present invention does not practically involve tackiness. Consequently, the short fibers carrying the polymer grafted according to the invention can be collected in a mass without remaining adherent to one another. Therefore they can be easily incorporated in the rubber and uniformly distributed into it.

The grafting of the polymer on the textile fibers can be carried out before or after said fibers have been subjected to the normal thermal and mechanical treatments of stretching and controlled shrinkage. It can also be done after a part of said treatments have been performed.

According to a usual technique, the short textile fibers can be given a preferred orientation in one direction during their uniform distribution in the rubber. This can also be done in a subsequent phase, for instance a calendering operation. It can be done further in both phases.

In the present description and in the claims use is made of the expression "textile fibers" either alone or in combination with adjectives, as "continuous" or "short," or with the expression "short discontinuous"; it is understood that the single expression "textile fibers" comprises the meanings indicated by said words.

It is also understood that for the purposes of the present invention the expression "continuous textile fibers" does not only mean "filamentary extruded products in the form of fibers, yarns, twists or cords," but also means in a broader sense "fabrics," "cord fabrics and the like."

The present invention will now be better illustrated by the following examples, which are not intended to be limiting:

EXAMPLE I

This example concerns the grafting of a copolymer obtained from alpha-chloro-acrylonitrile and butadiene on a twist of polyhexamethyleneadipamide fiber: 4 g. (corresponding to a piece having a length of approximately 13 m.) of twist of polyhexamethyleneadipamide fiber (count dtex. 1400 x 2 twists per dm. 40 x 40 ZS) which are subjected to extraction for 1 hour with boiling ethyl alcohol in a Soxhlet apparatus in order to eliminate foreign substances present on the surface of the fiber. The extracted textile material, wound up on a small aluminum frame having a length of about 16 cm., is placed in a conventional laboratory polymerization bottle together with 150 ml. of distilled water, 0.16 g. of a non-ionic emulsifier Emulphor O (condensation product of a cyclic ethylene oxide with oleic acid, produced by Badische Anilin und Soda Fabrik A.G.), and 12.3 g. of a solution of cerium and ammonium nitrate $(NH_4)_2[Ce(NO_3)_6]$ (titer >97%) obtained by dissolving 55.6 g. of cerium and ammonium nitrate into 1 l. of nitric acid 1 N. Then 2 g. of alpha-chloro-acrylonitrile and 6 g. of butadiene are added.

The bottle is closed in the usual fashion and is placed under rotation in a thermostatic bath at 35° C. The polymerization is carried out for 16 hours.

The bottle is then opened, and the textile material is removed and washed first with methyl alcohol and then with distilled water.

A considerable amount of polymeric material is observed on said textile material. In order to eliminate the butadiene - alpha - chloro - acrylonitrile copolymer not grafted on the textile material, the twist is treated for 1 hour with dimethylformamide at 50° C. under stirring and is then washed again with methyl alcohol and distilled water. By means of this treatment the non-grafted copolymer swells and detaches from the textile material.

After drying, up to constant weight, in an oven at 60° C. and under vacuum created by a water pump it is observed that the weight of the textile material has increased by 4%, which value corresponds to the percentage of grafted copolymer.

The variations of the tensile strength of the twist of polyhexamethyleneadipamide consequent to the grafting are then evaluated. The obtained values are reported in the following table and demonstrate a slight degradation:

| Twist of polyhexamethyleneadipamide: | Tensile strength (kg.) |
|---|---|
| Not treated | 20 |
| Treated | 18.5 |
| Not treated and kept for 1 hour at 150° C. | 20 |
| Treated and kept for 1 hour at 150° C. | 15 |

The so treated textile twist is subsequently used for the preparation and the vulcanization of specimens for the rubber bonding tests in comparison with two other analogous pieces of twist, one of polyhexamethyleneadipamide not treated and the other of polyhexamethyleneadipamide subjected to an analogous grafting process with alpha-chloro-acrylonitrile alone, without butadiene. The method for measuring the adhesion between a twist and the rubber is described by S. Eccher and C. Canevari in "Kautschuk und Gummi-Kunststoffe," 1969, pages 228–232.

The specimen consists of a small block of rubber compound, of cylindrical shape, whose outer surface is supported by a metallic frame attached to the rubber compound by means of an adhesive agent. The uncured twist, in axial position, is embedded in the cylinder in such a way as to project from it for a certain length. The specimen is cured by keeping the twist under tension. The actual contact area on which the adhesion takes place between the twist and the rubber compound is that corresponding to a length of 2 cm., namely to the length of the part of twist embedded in the compound.

The rubber compound used has the following recipe:

| | Parts |
|---|---|
| Natural rubber | 100 |
| "Furnace" black | 37 |
| Zinc oxide | 5 |
| Stearic acid | 3 |
| Mineral oil | 3 |
| Cyclohexylbenzothiazylsulphenamide | 1 |
| Aminic antioxidant | 1.4 |
| Sulphur | 2.8 |

The specimens are cured at a temperature of 143° C. for 40 minutes. The bonding between the textile material and the rubber is evaluated by determining the force necessary to pull away the twist axially from the rubber part of the specimen at room temperature by means of a dynamometer. This force is called "pulling force." The obtained pulling force values reported in the following table constitute the average of five evaluations.

| Twist of polyhexamethyleneadipamide: | Pulling force (kg.) |
|---|---|
| Not treated | 1 |
| Treated with alpha-chloro-acrylonitrile | 1 |
| Treated with alpha-chloro-acrylonitrile and butadiene | 15 |

EXAMPLE II

This example concerns the grafting of a polymer obtained from 2,3-dichlorobutadiene-1,3 on a twist of polyhexamethyleneadipamide fiber.

The procedure is the same as in Example I, with the only difference that butadiene and alpha-chloro-acrylonitrile are replaced by 6 g. of 2,3-dichlorobutadiene-1,3.

The pulling force values obtained in the textile/rubber bonding test are reported in the following table:

Twist of polyhexa-                         Pulling
methyleneadipamide:                    force (kg.)
   Not treated _____  1
   Treated with 2,3-dichlorobutadiene-1,3 _____ 15

EXAMPLE III

This example concerns the grafting of a copolymer obtained from alpha-chloro-acrylonitrile and butadiene on a twist of polycaprolactam fiber.

The procedure is the same as in Example I, with the only difference that the polyhexamethyleneadipamide fiber is replaced by the polycaprolactam fiber (count dtex. 1400 x 2 twists per dm. 40 x 40 ZS).

The pulling force values obtained in the textile/rubber bonding test are reported in the following table:

Polycaprolactam twist:          Pulling force (kg.)
   Not treated _____  1
   Treated with alpha-chloro-acrylonitrile and butadiene _____ 12

EXAMPLE IV

This example concerns the grafting of a copolymer obtained from alpha-chloro-acrylonitrile and butadiene on a twist of polyester fiber.

The procedure is the same as in Example I, with the only difference that the polyhexamethyleneadipamide fiber is replaced by the polyester fiber (count dtex. 1200 x 2 twists per dm. 53 x 53 ZS).

The values of the pulling force obtained in the textile/rubber bonding test are reported in the following table:

Polyester twist:                Pulling force (kg.)
   Not treated _____  1
   Treated with alpha-chloro-acrylonitrile and butadiene _____ 10

EXAMPLE V

This example concerns the grafting of a copolymer obtained from alpha-chloro-acrylonitrile and butadiene on a twist of regenerated cellulose fiber (Rayon Viscosa).

The procedure is identical to that of Example 1, except that the polyhexamethyleneadipamide fiber is replaced by the regenerated cellulose fiber (count dtex. 1840 x 2 twists per dm. 49 x 49 ZS).

No extraction of the copolymer not grafted on the textile material is carried out.

The obtained values of pulling force are:

Twist of regenerated cellulose:   Pulling force (kg.)
   Not treated _____ 2.5
   Treated with alpha-chloro-acrylonitrile and butadiene _____  8

EXAMPLE VI

This example concerns the grafting of a copolymer obtained from alpha-chloro-acrylonitrile and butadiene on the flock of polyhexamethyleneadipamide fiber.

A copolymer of alpha-chloro-acrylontrile and butadiene is grafted on the flock as in Example I, with the only difference being that the twist of polyhexamethyleneadipamide fiber is replaced by flock of the same fiber (count 6 denier; length of the single elements about 8 mm).

Due to the type of textile material treated, it has not been possible to carry out bonding tests on the cured compound. However, by virtue of the identity of its chemical nature with respect to that of the material used in Example 1, it is to be assumed that the bonding values are of the same order. The flock, carrying the grafted copolymer, is added, in a laboratory open mill, to the same compound indicated for preceding examples, care being taken that the dispersion of said textile material in the compound is the best possible. A sheet having approximately a 2-mm. thickness is prepared by calendering with the so obtained material. This operation is effected by subsequent passages in the calender, always in the same direction, which originate the preferred orientation of the flock along the calendering direction.

Rectangular specimens are obtained from said sheet and are cured at 143° C. for 40 minutes; some specimens have their greater axis in the same direction as that of calendering, whilst others have their greater axis in a direction orthogonal to this.

Tension tests, according to ISO/R137 Standard, are carried out on such specimens. The tests are effected on these specimens, with the flock carrying the grafted copolymer, in respective amounts of 10 parts and of 30 parts on 100 parts of the used compound, and in comparison with specimens having non-treated flock and with specimens of the compound without flock.

The results (average of three evaluations) are reported in the following table:

| Direction | CR (g./mm.²) | | CA 10% (g./mm.²) | | AR (percent) | |
|---|---|---|---|---|---|---|
| | Calender | Orthogonal | Calender | Orthogonal | Calender | Orthogonal |
| Compound alone | 2,800 | | | | 500 | |
| With 10 parts of non-treated flock | 1,100 | 800 | 350 | 86 | 48 | 200 |
| With 10 parts of treated flock | 1,150 | 850 | 300 | 90 | 60 | 196 |
| With 30 parts of non-treated flock | 2,600 | 750 | 800 | 120 | 32 | 150 |
| With 30 parts of treated flock | 2,550 | 850 | 870 | 120 | 40 | 120 |

In the above table the references CR, CA, 10% and AR mean respectively "tensile strength," "10% elongation" and "ultimate elongation."

In said table "cal." and "orth." are respective abbreviations of the words "calendering" (direction) and "orthogonal."

As is noted from the table, the static tests do not bring into evidence substantial differences between the cured specimens containing treated flock and those containing non-treated flock. The high difference of the physical parameters obtained in the calendering direction and in orthogonal direction shows that an orientation of the flock in the compound has taken place during said calendering operation.

Further, fatigue tests under tension are carried out.

To this end rectangular specimens in the form of strips having a thickness of 2 mm., a width of 5 mm. and an actual length of 100 mm., and whose greater axis lies in the same direction as that of calendering, are obtained from the calendered sheet as reported above. Fatigue tests are carried out on such specimens by imparting to them an elongation variable from 0 to 10% and from 0 to 15% in an apparatus having an alternative motion at a frequency of 300 cycles/minute.

| Direction | CR (g./mm.²) | | CA 10% (g./mm.²) | | AR (percent) | |
|---|---|---|---|---|---|---|
| | Calender | Orthogonal | Calender | Orthogonal | Calender | Orthogonal |
| Compound alone | 1,400 | | | | 730 | |
| With 10 parts of non-treated flock | 900 | 850 | 320 | 39 | 48 | 540 |
| With 10 parts of treated flock | 900 | 750 | 250 | 29 | 50 | 490 |
| With 30 parts of non-treated flock | 2,300 | 550 | 750 | 71 | 44 | 400 |
| With 30 parts of treated flock | 2,250 | 500 | 600 | 76 | 40 | 300 |

The times at which the breaking occurs are reported in the following table:

| | Breaking time | | | |
|---|---|---|---|---|
| | Maximum elongation of 10% | | Maximum elongation of 15% | |
| Compound with | Minutes | Hours | Minutes | Hours |
| 10 parts of nontreated flock | | 20 | | 1½ |
| 10 parts of treated flock | | 30 | | 5 |
| 30 parts of nontreated flock | 45 | | 40 | |
| 30 parts of treated flock | | 30 | | 2¼ |

The relevant different noticed between the behavior of the compound containing flock carrying the grafted copolymer, in respect of the compound containing non-treated flock, is obviously due to the better bonding between the rubber and the textile material which takes place in the first case in respect of the second.

At last, repeated flexion tests are carried out on specimens of elongated shape, obtained from the sheet of compound containing 30 parts of flock; in such specimens a concentration of the flexion stresses is obtained by reducing their section by means of a central groove, perpendicular to the direction along which the stress is applied; said direction is correspondent to the direction of calendering of the specimens. The specimens are bonded on an inextensible flat belt, rotating between two pulleys (1000 r.p.m.) and having a maximum tension deformation of the order of 12% at its passage on the pulley of smaller diameter (76 mm.), and are subjected to a number of flexions corresponding to the times indicated for each case on the following table without showing an initial crack:

| | Initial crack | | Final crack, hours |
|---|---|---|---|
| Compound with | Minutes | Hours | |
| 30 parts of nontreated flock | 40 | | 3¼ |
| 30 parts of treated flock | | 15 | >20 |

EXAMPLE VII

This example is carried out with the same procedure used in Example VI, with the following variations:

(a) The previously used rubber compound is replaced by another compound not containing carbon black and having the following recipe:

| | Parts |
|---|---|
| Natural rubber | 100 |
| Zinc oxide | 5 |
| Stearic acid | 2.5 |
| Phenylbetanaphthylamine | 1 |
| Plasticizing mineral oil | 3 |
| Mercaptobenzothiazol | 0.7 |
| Sulphur | 2.5 |

(b) The specimens are cured, at 143° C., for 30 minutes instead of 40 minutes. The results of the tension tests (average of three evaluations) are reported in the following table:

As regards the references CR, CA 10% and AR, and the abbreviated words "cal." and "orth." of the above table, see the definitions indicated for the analogous table of Example V.

Also in this case the static tests do not bring into evidence substantial differences between the cured specimens containing non-treated flock.

The times at which the breaking of the specimens takes place in the fatigue tests under tension are reported in the following table:

| | Breaking time | | |
|---|---|---|---|
| | Maximum elongation of 10%, hours | Maximum elongation of 15% | |
| Compound with | | Minutes | Hours |
| 10 parts of nontreated flock | 7 | 40 | |
| 10 parts of treated flock | 30 | | 5 |
| 30 parts of nontreated flock | 5 | 30 | |
| 30 parts of treated flock | 5½ | 29 | |

In particular, for the cured specimens containing 10 parts of flock, a remarkable difference of behavior is noticed in the tests on treated flock with respect to those on non-treated flock.

As the invention has been described and represented only by way of non-limiting example, it is understood that it includes in its field of protection any modification to its whole and to its details which are deriving from the basic criteria on which the invention itself is based.

What is claimed is:

1. A process for bonding artificial or synthetic polymeric reinforcing textile fibers to rubber which comprises
    graft polymerizing a polymer characterized by having double bonds between carbon atoms and chlorine atoms onto said textile fibers,
    contacting the textile fibers carrying said grafted polymer with said rubber, and
    curing the contacted rubber in order to achieve bonding.

2. The process of claim 1 wherein said textile fibers are discontinuous short textile fibers.

3. The process of claim 2 wherein said discontinuous short textile fibers are directly incorporated into and uniformly distributed throughout the rubber after grafting.

4. The process of claim 3 wherein said rubber is cured while being simultaneously subjected to a shaping pressure.

5. The process of claim 1 wherein said textile fibers are continuous textile fibers before having said polymer grafted thereon and which are then cut into pieces of reduced length.

6. The process of claim 1 wherein said polymer is formed from 2,3-dichlorobutadiene-1,3.

7. The process of claim 1 wherein said polymer is a polymer of butadiene and alpha-chloro-acrylonitrile.

8. The process of claim 1 wherein said textile fiber is a regenerated cellulose fiber.

9. The process of claim 1 wherein said textile fiber is a polyamide fiber.

10. The process of claim 1 wherein said textile fiber is a polyester fiber.

References Cited
UNITED STATES PATENTS 3,475,251  10/1969  Widmeh _____ 156—338 X WILLIAM A. POWELL, Assistant Examiner U.S. Cl. X.R.

156—338; 161—151, 170, 255, 256